2,934,546
6α-FLUORO STEROIDS

Howard J. Ringold, Octavio Mancera, George Rosenkranz, and Albert Bowers, all of Mexico City, Mexico, assignors to Syntex S.A., Mexico City, Mexico, a corporation of Mexico No Drawing. Application June 9, 1958
Serial No. 740,550

Claims priority, application Mexico June 11, 1957

11 Claims. (Cl. 260—397.47)

The present invention relates to novel cyclopentanophenanthrene derivatives and to a process for the production thereof.

More particularly the present invention relates to 6α-fluoro derivatives of cortisone, hydrocortisone, 1-dehydro-cortisone, and 1-dehydro-hydrocortisone, as well as to their 21-esters with hydrocarbon carboxylic acids of less than 12 carbon atoms.

The present invention also relates to the 6α-fluoro derivatives of compound "S" i.e. 6α-fluoro-$\Delta^4$-pregnene-17α,21-diol-3,20-dione and its 1-dehydro derivative i.e. 6α-fluoro-$\Delta^{1,4}$-pregnadiene-17α,21-diol-3,20-dione as well as the 21-monoesters of both of these just mentioned compounds and the 17α,21-diesters with hydrocarbon carboxylic acids of less than 12 carbon atoms. All of these "S" derivatives just mentioned are important intermediates for the production of the corresponding compounds first mentioned having an 11-oxygen i.e. 11-keto or 11β-hydroxy groups since the "S" derivatives may be readily converted into the other compounds by biochemical oxygenation using methods well known in the art or by incubation with adrenal tissue as hereinafter set forth in detail. In addition the 17α,21-diesters of 6α-fluoro-"S" and 6α-fluoro-1-dehydro-"S" are valuable progestational hormones.

It has been discovered in accordance with the present invention that the 6α-fluoro derivatives of cortisone, hydrocortisone, 1-dehydro-cortisone, and 1-dehydro-hydrocortisone as well as the 21-esters of these compounds previously mentioned are important cortical hormones having anti-inflammatory properties of a high order together with a minimum of side reaction such as salt retention. For example, in liver glycogen tests, a standard test for antiinflammatory activity, 6α-fluoro-hydrocortisone acetate is at least ten times as active as the standard used for testing, namely, hydrocortisone acetate. In contrast, the 6β-fluoro-hydrocortisone acetate has been reported to be totally inactive in a similar test (E. Myles Glenn et al., Endocrinology, vol. 61, pages 128–142, especially page 141, 1957).

In accordance with the present invention it has been discovered that 6α-fluoro-cortisone or hydrocortisone may be prepared from the known 21-acetate of 3-ethylenedioxy-5,6-oxido-pregnane-17α,21-diol-11,20-dione and the known 21-acetate of 3,20-diethylenedioxy-5,6-oxido-pregnane-11β,17α,21-triol by reaction with gaseous hydrogen fluoride in acetic acid solution at a low temperature. The compounds thus prepared may be converted into their $\Delta^1$-dehydro analogues by refluxing with selenium dioxide in t-butanol in the presence of pyridine and under an atmosphere of nitrogen. Another method for the production of these compounds involves the production of the intermediate "S" compound, 6α-fluoro-"S." In this modification of the present invention the starting material is the 17, 21- diacetate of $\Delta^5$-pregnene-3β,17α,21-triol-20-one or the 3-formate-17, 21-diacetate of $\Delta^5$-pregnene-3β,17α,21-triol-20-one described by Ringold et al., J.A.C.S. 78, 820 (1956). In this modification of the present invention the starting materials are epoxidized to obtain the corresponding 5α,6α-epoxide and these epoxides are reacted with boron trifluoride to obtain the corresponding fluorohydrin namely, the 6β-fluoro-5α-hydroxy derivative. In the case of the triester, the formate group is hydrolyzed to the alcohol and the free hydroxyl group of the thus converted triester or the free compound is then oxidized to a keto group. The 17,21-diacetate of 6β-fluoro-pregnane-5α,17α,21-triol-3,20-dione thus obtained in dehydrated at C–5 by reaction with dry hydrogen chloride in acetic acid under anhydrous conditions. Under these conditions the dehydration is accompanied by a steric conversion at C–6 to give the corresponding diacetate of 6α-fluoro-$\Delta^4$-pregnene-17α,21-diol-3,20-dione (6α-fluoro-"S"). This diacetate as well as other esters, especially lower fatty acid esters, which may be formed by starting with a suitable starting material are, as previously set forth, valuable progestational hormones. Instead of a combined dehydration and inversion the compounds may be dehydrated with thionyl chloride to form the novel 6β-fluoro "S" derivatives and then inverted by treatment with acetic acid solution and dry hydrogen chloride to the 6α-fluoro compounds. These "S" derivatives may be converted into corresponding 6α-fluoro-1-dehydro-"S" derivatives by treatment with selenium dioxide and the "S" compounds may then be provided with the 11β-hydroxy group by treatment with adrenal tissue. To form the corresponding 11-keto compound the 11β-hydroxy group may be oxidized with chromic acid. The novel compounds of the present invention may therefore be illustrated by the following formulas:

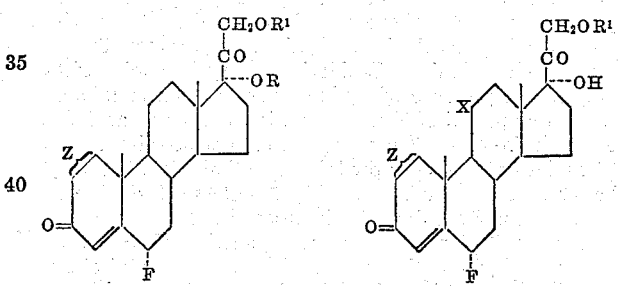

In the above formulas both R and $R^1$ represent hydrogen or an ester group derived from a hydrocarbon carboxylic acid of less than 12 carbon atoms. Typical hydrocarbon carboxylic acid groups are those derived from acetic, propionic, butyric, cyclopentylpropionic, benzoic, caproic, hemisuccinic, etc. $R^1$ may also be an ester group when R is hydrogen. Z represents a double bond between carbon atoms C–1 and C–2 or Z may represent a saturated linkage between carbon atoms C–1 and C–2. X represents a keto group or a β-hydroxy group. One of the processes for producing the compounds of the present invention may be illustrated by the following equation:

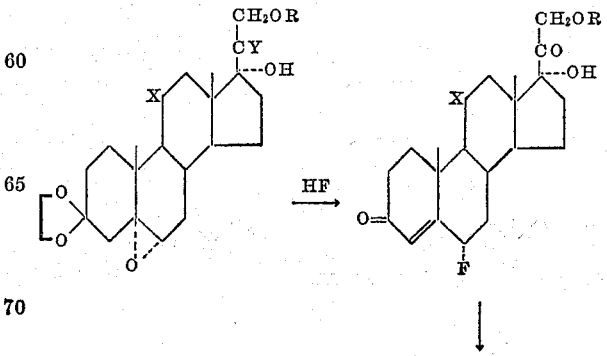

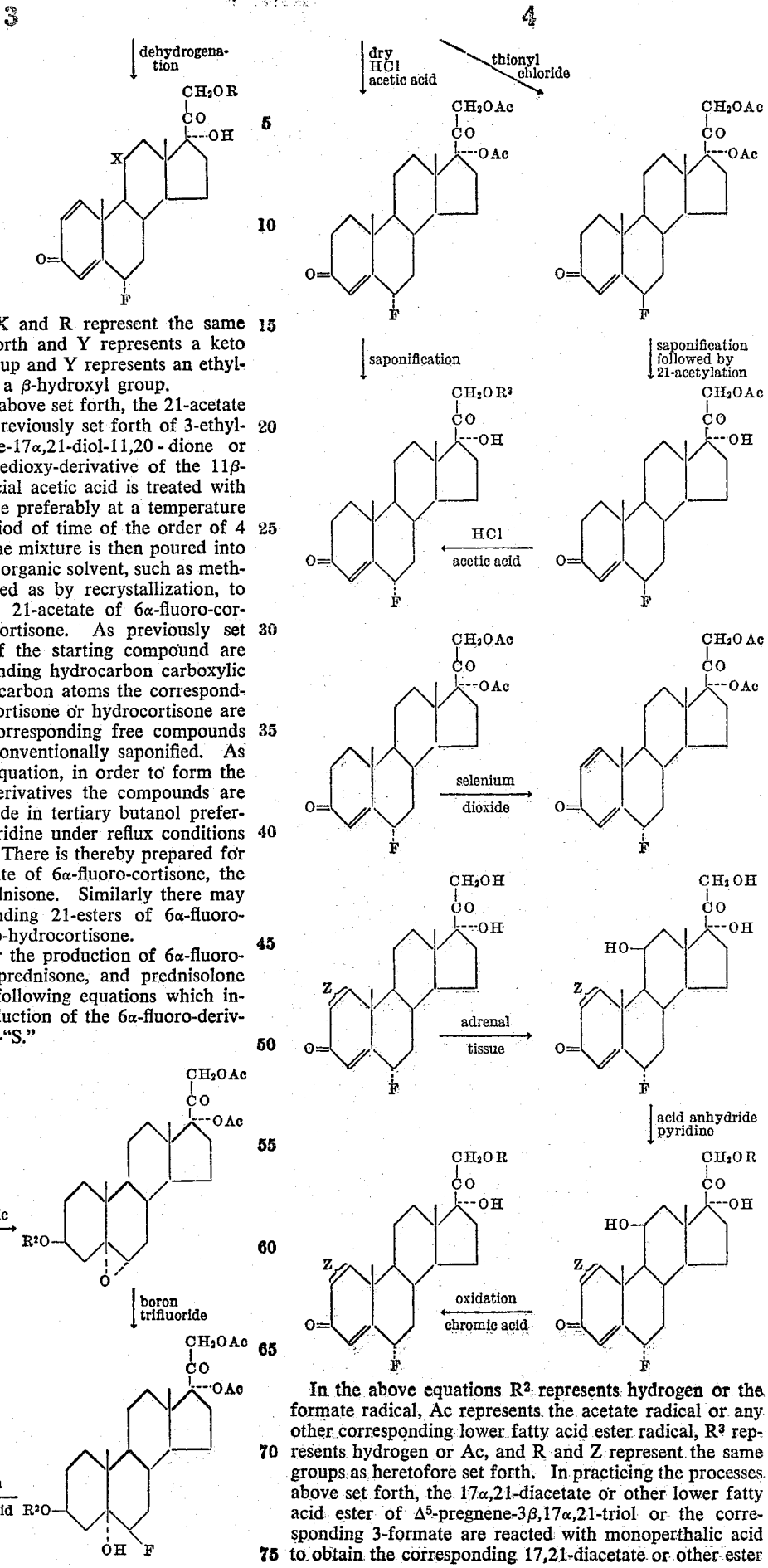

In the above equation X and R represent the same groups as heretofore set forth and Y represents a keto group when X is a keto group and Y represents an ethylenedioxy group when X is a β-hydroxyl group.

In practicing the process above set forth, the 21-acetate or other ester of the type previously set forth of 3-ethylenedioxy-5,6-oxido-pregnane-17α,21-diol-11,20-dione or the equivalent 3,20-ethylenedioxy-derivative of the 11β-hydroxy compound, in glacial acetic acid is treated with anhydrous hydrogen fluoride preferably at a temperature below 15° C. After a period of time of the order of 4 hours at less than 15° C. the mixture is then poured into ice water, extracted with an organic solvent, such as methylene dichloride and purified as by recrystallization, to produce the corresponding 21-acetate of 6α-fluoro-cortisone or 6α-fluoro-hydrocortisone. As previously set forth when other esters of the starting compound are used, such as the corresponding hydrocarbon carboxylic acid esters of less than 12 carbon atoms the corresponding 21-esters of 6α-fluoro-cortisone or hydrocortisone are prepared. To form the corresponding free compounds these esters may then be conventionally saponified. As pointed out in the above equation, in order to form the corresponding 1-dehydro-derivatives the compounds are treated with selenium dioxide in tertiary butanol preferably in the presence of pyridine under reflux conditions for a long period of time. There is thereby prepared for example from the 21-acetate of 6α-fluoro-cortisone, the 21-acetate of 6α-fluoro-prednisone. Similarly there may be prepared the corresponding 21-esters of 6α-fluoro-prednisolone from 6α-fluoro-hydrocortisone.

The modified process for the production of 6α-fluoro-cortisone, hydrocortisone, prednisone, and prednisolone may be illustrated by the following equations which involve the intermediate production of the 6α-fluoro-derivative of "S" and 1-dehydro-"S."

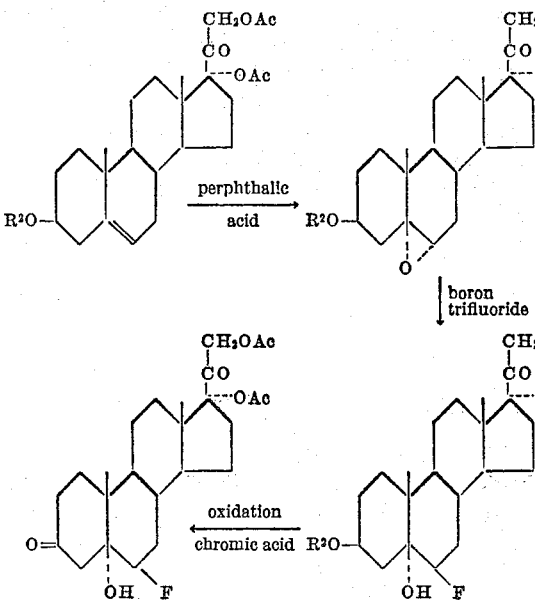

In the above equations $R^2$ represents hydrogen or the formate radical, Ac represents the acetate radical or any other corresponding lower fatty acid ester radical, $R^3$ represents hydrogen or Ac, and R and Z represent the same groups as heretofore set forth. In practicing the processes above set forth, the 17α,21-diacetate or other lower fatty acid ester of Δ⁵-pregnene-3β,17α,21-triol or the corresponding 3-formate are reacted with monoperthalic acid to obtain the corresponding 17,21-diacetate or other ester of 5α,6α-epoxido-pregnane-3β,17α,21-triol-20-one or the corresponding 3-formate. Either of these epoxides are then subjected to fluorination with boron trifluoride to obtain the corresponding 17,21-diacetate of 6β-fluoro-pregnane-3β,5α,17α,21-tetrol-20-one or the corresponding 3-formate, 17β,21-diacetate of this compound. The formate group, if present, is then hydrolyzed by reaction with hydrochloric acid in dioxane solution and the free 3β-hydroxyl group is then oxidized to a keto group by reaction with concentrated chromic acid. When the 17,21-diacetate of 6β-fluoro-pregnane-5α,17α,21-triol-3,20-dione is dehydrated at C–5 by reaction with dry hydrogen chloride in acetic acid solution there is formed the diacetate, or other lower fatty acid ester, if another ester has been used in the reaction, of 6α-fluoro-Δ⁴-pregnene-17α,21-diol-3,20-dione. If instead, the fluorohydrin compound is dehydrated with thionyl chloride there is obtained for example the diacetate of 6β-fluoro-Δ⁴-pregnene-17α,21-diol-3,20-dione which may be saponified with potassium hydroxide to form the free compound and then reacetylated at C–21 by routine methods. This compound is then treated with an acetic acid solution and dry hydrogen chloride to produce the same 21-acetate of 6α-fluoro-Δ⁴-pregnene-17α,21-diol-3,20-dione as may be obtained from the other method. As may be understood the acetylated or other lower fatty acid groupings may be saponified with potassium hydroxide, for example in methanol, to give the free 6α-fluoro-"S" derivative. As indicated in the second equation above these "S" derivatives may be converted to 1-dehydro-"S" derivatives by treatment with selenium dioxide and the 6α-fluoro-"S" or 1-dehydro-"S" compounds may be provided with an 11β-hydroxy group by incubation with adrenal tissue under the conditions set forth in U.S. Patent No. 2,671,752, granted March 9, 1954, to Alejandro Zaffaroni whereby 6α-fluoro-hydrocortisone and 6α-fluoro-prednisone are formed. 11β-hydroxyl derivatives thus prepared may then be oxidized with chromic acid to form the corresponding cortisone or prednisone type derivatives namely, 6α-fluoro-cortisone and 6α-fluoro-prednisone.

The following specific examples serve to illustrate but are not intended to limit the present invention.

*Example I*

A suspension of 2 g. of the 21-acetate of 3-ethylenedioxy-5,6-oxido-pregnane-17α,21-diol-11,20-dione in 100 cc. of glacial acetic acid was slowly treated under stirring with 3 g. of anhydrous hydrogen fluoride, taking care that the temperature did not rise over 15° C. After 4 hours at 15° C., the mixture was poured into ice water, extracted with methylenedichloride, washed with water, with sodium bicarbonate solution and water, dried over anhydrous sodium sulfate and evaporated to dryness. Two recrystallizations of the residue from acetone-hexane afforded the 21-acetate of 6α-fluoro-cortisone.

A mixture of 500 mg. of this compound, 25 cc. of anhydrous t-butanol, 150 mg. of selenium dioxide and 0.05 cc. of pyridine was refluxed for 70 hours under an atmosphere of nitrogen. After cooling, the mixture was diluted with 50 cc. of ethyl acetate and filtered through celite, washing well the residue with ethyl acetate. The filtrate and washings were combined and the solution was washed with water, dried over anhydrous sodium sulfate, filtered and evaporated to dryness under reduced pressure. The residue was triturated with water and the precipitate was filtered, dried and chromatographed with 25 g. of washed alumina. The crystalline fractions eluted with benzene-ether and ether were combined and recrystallized from acetone-hexane, thus giving the 21-acetate of 6α-fluoro-prednisone.

*Example II*

2 g. of the 21-acetate of 3-ethylenedioxy-5,6-oxido-pregnane-17α,21-diol-11,20-dione was dissolved in 40 cc. of redistilled chloroform in a container resistant to hydrofluoric acid, such as a polyethylene flask for example, and then cooled to 0° C. While this temperature was maintained, there was slowly added under stirring a cool solution of 3 g. of anhydrous hydrofluoric acid in pure chloroform. The mixture was stirred for 4 hours further at a temperature of 0° C. and then a saturated aqueous solution of sodium bicarbonate was cautiously added until the mixture showed a weak alkaline reaction.

The solution was transferred to a separatory funnel and well washed with water and the chloroform was removed by distillation under reduced pressure. The residue was dissolved in glacial acetic acid and a stream of dry hydrogen chloride was passed through the solution while the temperature was maintained below 15° C. After pouring into ice water the reaction product was extracted with methylene dichloride and successively washed with water, sodium bicarbonate solution and water, dried over anhydrous sodium sulfate and evaporated to dryness. The residue crystallized from acetone-hexane to yield the 21-acetate of 6α-fluoro-cortisone, identical to the compound obtained in accordance with the previous example.

*Example III*

When in the experiments described in the previous examples the 21-acetate of 3-ethylenedioxy-5,6-oxido-pregnane-17α,21-diol-11,20-dione was substituted by the 21-acetate of 3,20-di-ethylenedioxy-5,6-oxido-11β,17α,21-triol, there were obtained the 21-acetates of 6α-fluoro-hydrocortisone and 6α-fluoro-prednisone, respectively.

*Example IV*

100 mg. of the 21-acetate of 6α-fluoro-cortisone was dissolved in 20 cc. of methanol, cooled to 0° C. and treated under an atmosphere of nitrogen with 12 mg. of sodium methoxide. After standing for 15 minutes at 0° C., the mixture was neutralized with acetic acid, the methanol was evaporated nearly to dryness under reduced pressure, the residue was diluted with water and the precipitate formed was collected. One crystallization from acetone afforded the free 6α-fluoro-cortisone.

Similarly, the saponification of the corresponding 21-acetates yielded the free 6α-fluoro-hydrocortisone, 6α-fluoro-prednisone and 6α-fluoro-prednisolone.

*Example V*

A mixture of 500 mg. of 6α-fluoro-prednisolone, 5 cc. of pyridine and 0.5 cc. of propionic anhydride was kept at room temperature for 4 hours and then poured into ice water and extracted with methylene dichloride. The extract was washed with dilute hydrochloric acid, sodium bicarbonate solution and water, dried over anhydrous sodium sulfate, filtered and evaporated to dryness. Crystallization of the residue from acetone-hexane gave the 21-propionate of 6α-fluoro-prednisolone.

Similarly, by reaction with acid anhydride or chlorides having from 2 to 12 carbon atoms, there was prepared the corresponding 21-esters of the 6α-fluoro derivatives of cortisone, hydrocortistone, prednisone, and prednisolone. These were the propionate, butyrate, cyclopentylpropionate, benzoate etc.

*Example VI*

1.5 mols of perphthalic acid in ether was added to a solution of 5 g. of the 17,21-diacetate of Δ⁵-pregnene-3β,17α,21-triol-20-one in 100 cc. of chloroform and the mixture was kept for 20 hours at room temperature. After dilution with water, the organic layer was separated, washed with water, sodium bicarbonate solution and water to neutral, dried over anhydrous sodium sulfate, filtered and evaporated to dryness under reduced pressure. Crystallization of the residue from acetone-hexane afforded the 17,21-diacetate of 5α, 6α-oxido-pregnan-3β, 17α,21-triol-20-one, M.P. 198–200° C., [α]$_D$ —54° (chloroform).

3 cc. of boron trifluoride etherate was added to a solution of 3 g. of the above compound in 300 cc. of a mixture of equal parts of ether and benzene and the mixture was kept for 3 hours at room temperature. It was then washed with water, dried over anhydrous sodium sulfate and evaporated to dryness. The residue was purified by chromatography on alumina to give the 17,21-diacetate of 6β-fluoro-pregnane-3β,5α,17α,21-tetrol-20-one, M.P. 176–178° C., [α]$_D$ −57° (chloroform).

A solution of 3 g. of this tetrolone in 150 cc. of acetone was treated with an 8 normal solution of chromic acid prepared by mixing 1.6 g. of chromium trioxide with concentrated sulfuric acid and water. This oxidizing reagent was added dropwise to the stirred solution while the temperature was maintained below 0°, in the course of 2 minutes. The stirring was continued for 5 minutes further at 0° C. and then the solution was diluted with water and extracted with ether. The ether extract was washed with water, dried over anhydrous sodium sulfate and evaporated to dryness. The residue crystallized from acetone-hexane to produce the 17,21-diacetate of 6β-fluoro - pregnane - 5α,17α,21 - triol - 3,20 - dione, M.P. 225–227° C., [α]$_D$±0°.

2 g. of the 17,21-diacetate of 6β-fluoro-pregnane-5α,17α,21-triol-3,20-dione was dissolved in 100 cc. of glacial acetic acid and a slow stream of dry hydrogen chloride was passed into the solution for 2 hours at a temperature around 18° C. The mixture was poured into ice water, the precipitate formed was collected and washed with water, dried and crystallized from acetone-hexane. There was thus produced the diacetate of 6α-fluoro-Δ$^4$-pregnane-17α,21-diol-3,20-dione, ultraviolet absorption λ max. 236 mμ, log e 4.22, [α]$_D$+53° (chloroform). When the starting material was other 17,21-diesters of Δ$^5$-pregnen-3β,17α,21-triol-20-one, the corresponding 17,21-diesters of 6α-fluoro "S" were obtained. These were the dipropionate, dicaproate and dibenzoate.

1 g. of the 17,21-diacetate of 6α-fluoro-"S" obtained as has been described above, was suspended in 10 cc. of 1% methanolic potassium hydroxide previously cooled to 0° C. The mixture was stirred for 2 hours at 0° C. under an atmosphere of nitrogen, neutralized with acetic acid, diluted with water and the precipitate was filtered, washed with water, dried and crystallized from acetone-hexane. There was thus obtained the free 6α-fluoro-Δ$^4$-pregnene-17α,21-diol-3,20-dione, i.e. 6α-fluoro-"S", M.P. 203–205° C., [α]$_D$+135° (chloroform).

*Example VII*

By an analogous method to that described in the previous example, the treatment of the 3-formate-17,21-diacetate of Δ$^5$-pregnene-3β,17α,21-triol-20-one with monoperphthalic acid produced the 3-formate-17,21-diacetate of 5α,6α-oxido-pregnane-3β,17α,21 - triol - 20 - one (M.P., 238–240° C.) [α]$_D$−57° (chloroform); reaction of this compound with boron trifluoride afforded the 3-formate-17,21-diacetate of 6β-fluoro-3β,5α,17α,21 - tetrol-20 - one (M.P. 199–200° C., [α]$_D$−46° (chloroform)).

5 cc. of concentrated hydrochloric acid was added to a suspension of 5 g. of the 3-formate-17,21-diacetate of 6β-fluoro-pregnan-3β,5α,17α,21-tetrol-20-one in 150 cc. of dioxane and 30 cc. of water and the mixture was stirred at room temperature for 7 hours. After pouring into a cold saturated solution of sodium chloride the precipitate was collected, washed with water, dried and recrystallized from acetone-hexane to give the 17,21-diacetate of 6β-fluoro-pregnane-3β,5α,17α,21-tetrol - 20 - one, identical to the compound obtained in accordance with Example No. VI.

*Example VIII*

A solution of 2.5 g. of the 17,21-diacetate of 6β-fluoro-pregnane - 5α,17α,21 - triol - 3,20 - dione, prepared by the method described in Example VI, in 30 cc. of pyridine was cooled to 0° C. and treated dropwise with 3 cc. of thionyl chloride, under stirring and maintaining the temperature below 0° C. The stirring was continued for 2 hours further, the mixture was poured into ice water and the product was extracted with methylene dichloride. The extract was washed with water, dilute hydrochloric acid, 5% sodium carbonate solution and water, dried over anhydrous sodium sulfate and evaporated to dryness. The residue was chromatographed on neutral alumina, thus giving the 17,21-diacetate of 6β-fluoro-Δ$^4$-pregnene-17α,21-diol-3,20-dione, i.e. the 17,21-diacetate of 6β-fluoro-"S."

1 g. of the 17,21-diacetate of 6β-fluoro-"S" was suspended in 10 cc. of 1% methanolic potassium hydroxide, stirred for 1 hour under an atmosphere of nitrogen, acidified with acetic acid and diluted with water. The precipitate was collected, washed with water, dried and recrystallized from acetone-hexane, thus giving the free 6β-fluoro-Δ$^4$-pregnene-17α,21-diol-3,20-dione, i.e. 6β-fluoro-"S".

A mixture of 500 mg. of 6β-fluoro-Δ$^4$-pregnene-17α,21-diol-3,20-dione, 5 cc. of pyridine and 0.5 cc. of acetic anhydride was kept overnight at room temperature, poured into ice water, extracted with methylene dichloride, washed with dilute hydrochloric acid, sodium bicarbonate solution and water to neutral, dried over anhydrous sodium sulfate and evaporated to dryness. The residue consisted of the crude 21-acetate of 6β-fluoro-Δ$^4$-pregnene-17α,21-diol-3,20-dione, i.e., the 21-acetate of 6β-fluoro-"S". The analytical sample was obtained by recrystalization from acetone-hexane.

500 mg. of this monoacetate was treated with dry hydrogen chloride in acetic acid solution by the method described in Example VI. Crystallization of the product from acetone-hexane yielded the 21-acetate of 6α-fluoro-Δ$^4$-pregnene-17α,21-diol-3,20-dione, i.e., the 21-acetate of 6α-fluoro-"S".

A suspension of 500 mg. of this 21-acetate in 5 cc. of 1% methanolic potassium hydroxide was stirred for 1 hour under an atmosphere of nitrogen. Crystallization of the crude product from acetone-hexane afforded 6α-fluoro-Δ$^4$-pregnene-17α,21-diol-3,20-dione, identical to the final compound obtained in Example VI.

*Example IX*

A mixture of 5 g. of the diacetate of 6α-fluoro-Δ$^4$-pregnene-17α,21-diol-3,20-dione, 250 cc. of anhydrous t-butanol, 1.5 g. of selenium dioxide and 0.5 cc. of pyridine was refluxed for 70 hours under an atmosphere of nitrogen, cooled, diluted with ethyl acetate and filtered through celite; the filter was washed with hot ethyl acetate and the combined filtrate and washings was evaporated to dryness under reduced pressure. The residue was triturated with water, the precipitate was collected, dried and purified by chromatography over 250 g. of washed alumina. Elution of the column with benzene-ether and ether and evaporation to dryness of the fractions afforded crystalline products which were combined and recrystallized from acetone-hexane, thus producing the diacetate of 6α-fluoro-Δ$^{1,4}$-pregnadiene-17α,21-diol-3,20-dione. Other esters of hydrocarbon carboxylic acids of 2 to 12 carbon atoms were also thus prepared such as the dipropionate and dicaproate.

A suspension of 2 g. of the diacetate of 6α-fluoro-Δ$^{1,4}$-pregnadiene-17α,21-diol-3,20-dione in 20 cc. of absolute methanol was mixed with a solution of sodium methoxide in methanol prepared by dissolving 120 mg. of sodium in 5 cc. of absolute methanol; the addition was carried out with stirring under an atmosphere of nitrogen at 0° C. The stirring was continued under nitrogen for 2 hours at 0° C., and then the mixture was poured into 50 cc. of water containing 1 cc. of acetic acid, the precipitate was filtered, washed with water, dried and recrystallized from acetone-hexane, thus producing the free 6α-fluoro-Δ$^{1,4}$-pregnadiene-17α,21-diol-3,20-dione.

*Example X*

A mixture of 1 g. of 6α-fluoro-Δ$^{1,4}$-pregnadiene-17α,21-diol-3,20-dione, 10 cc. of pyridine and 1 cc. of acetic anhydride was kept at room temperature for 4 hours and then poured into ice water. The precipitate was collected, washed with water, dried and recrystallized from acetone-hexane, thus yielding the 21-acetate of 6α-fluoro-Δ$^{1,4}$-pregnadiene-17α,21-diol-3,20-dione.

Example XI

When in the method of Example X the acetic anhydride was substituted by propionic anhydride, there was obtained the 21-propionate of 6α-fluoro-Δ$^{1,4}$-pregnadiene-17α,21-diol-3,20-dione.

Example XII

The following solutions A, B and C were prepared using distilled water as solvent: solution A was prepared by mixing 425 cc. of a 1.742% dipotassium hydrogen phosphate solution ($K_2HPO_4$) with 75 cc. of 1.38% monosodium dihydrogen phosphate; solution B was prepared by diluting a mixture of 1 lt. of 4.5% sodium chloride solution, 40 cc. of a 5.75% potassium chloride solution and 10 cc. of a 19.1% magnesium sulfate, to a volume of 5 lt.; solution C was prepared by dissolving 20.9 g. of fumaric acid and 14.4 g. of sodium hydroxide in 1 lt. of water and diluting the solution to 1.2 lt. Then 475 cc. of solution A, 4.32 lt. of solution B and 1.2 lt. of solution C were mixed.

The fat was removed from the adrenal glands obtained from recently slaughtered bovine and the glands were ground in a meat grinder until an homogeneous mass was obtained; 3 kg. of this mass was then added to 6 lt. of the mixture of solutions A, B and C, obtained as described above, and the mixture was vigorously stirred.

There was then added 3 g. of 6α-fluoro-Δ$^4$-pregnene-17α, 21-diol-3,20-dione in 16 cc. of propylene glycol and the mixture was stirred again at a temperature of 28-37° C. for 3 hours. 40 lt. of acetone was then added and the stirring was continued for one hour further at room temperature.

The solid was removed by filtration and washed twice with 10 lt. fractions of acetone; the washings were combined with the filtrate and concentrated under reduced pressure below 30° C. to a volume of approximately 5 lt. The aqueous residue was washed three times with 4 lt. portions of hexane and the hexane was discarded. The aqueous residue was then extracted with 2 portions of 3 lt. of methylene dichloride, the extract was washed with water, dried over anhydrous sodium sulfate, and concentrated to a volume of approximately 300 cc., under vacuum and below room temperature.

The concentrated solution was allowed to pass through a column prepared with a mixture of 90 g. of silica and 90 g. of celite. The column was washed with 3 lt. of methylene dichloride and then with a mixture of 900 cc. of methylene dichloride and 100 of acetone. The product was then eluted with mixtures of methylene dichloride and acetone (80:20 and 70:30). The solvents from these elutions was evaporated and the residue crystallized from ethyl acetate. There was thus obtained 6α-fluoro-hydrocortisone.

1 g. of 6α-fluoro-hydrocortisone was mixed with 10 cc. of pyridine and 1 cc. of acetic anhydride and allowed to stand overnight. It was then poured into ice water, stirred for half an hour at room temperature, and the precipitate was collected, washed with water, dried and recrystallized from acetone-hexane, thus giving the 21-acetate of 6α-fluoro-hydrocortisone.

A stirred solution of 500 mg. of the 21-acetate of 6α-fluorohydrocortisone in 30 cc. of acetic acid was slowly treated with a solution of 130 mg. of chromic acid in 1 cc. of water and 8 cc. of acetic acid and the mixture was kept at room temperature for 2 hours. After pouring into water, the precipitate was filtered, washed with water, dried and recrystallized from acetone-hexane to yield the 21-acetate of 6α-fluoro-cortisone.

Example XIII

By an analogous method to that described in Example XII, but starting from 6α-fluoro-Δ$^{1,4}$-pregnadiene-17α,21-diol-3,20-dione, there were obtained 6α-fluoro-prednisolone and its 21-acetate, as well as the 21-acetate of 6α-fluoro-prednisone, respectively.

Example XIV

When in the method of the previous examples the acetic anhydride was substituted by another acid anhydride having from 3 to 12 carbon atoms, there were obtained the corresponding 21-esters of 6α-fluoro-hydrocortisone, 6α-fluoro-prednisolone, 6α-fluoro-cortisone and 6α-fluoro-prednisone, respectively, these were the propionate, butyrate, benzoate, cyclopentylpropionate, hemisuccinate, and β-chloropropionate.

We claim:
1. Compounds of the following formula:

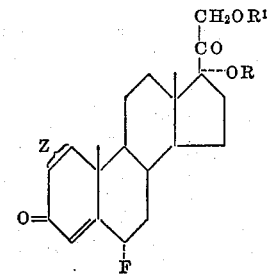

wherein Z is selected from the group consisting of a double bond between C–1 and C–2 and a saturated linkage between C–1 and C–2, $R^1$ is selected from the group consisting of hydrogen and a hydrocarbon carboxylic acyl of less than 12 carbon atoms, R is hydrogen when $R^1$ is hydrogen and R is selected from the group consisting of hydrogen and a hydrocarbon carboxylic acyl of less than 12 carbon atoms when $R^1$ is acyl.

2. 6α-fluoro-Δ$^4$-pregnen-17α,21-diol-3,20-dione.
3. The 21-hydrocarbon carboxylic monoesters of less than 12 carbon atoms of 6α-fluoro-Δ$^4$-pregnen-17α,21-diol-3,20-dione.
4. The 17,21-hydrocarbon carboxylic di-esters of less than 12 carbon atoms of 6α-fluoro-Δ$^4$-pregnen-17α,21-diol-3,20-dione.
5. The 21-acetate of 6α-fluoro-Δ$^4$-pregnen-17α,21-diol-3,20-dione.
6. The 17,21-diacetate of 6α-fluoro-Δ$^4$-pregnen-17α,21-diol-3,20-dione.
7. 6α-fluoro-Δ$^{1,4}$-pregnadien-17α,21-diol-3,20-dione.
8. The 21-hydrocarbon carboxylic monoesters of less than 12 carbon atoms of 6α-fluoro-Δ$^{1,4}$-pregnadien-17α,21-diol-3,20-dione.
9. The 17,21-hydrocarbon carboxylic di-esters of less than 12 carbon atoms of 6α-fluoro-Δ$^{1,4}$-pregnadien-17α,21-diol-3,20-dione.
10. The 21-acetate of 6α-fluoro-Δ$^{1,4}$-pregnadien-17α,21-diol-3,20-dione.
11. The 17,21-diacetate of 6α-fluoro-Δ$^{1,4}$-pregnadien-17α,21-diol-3,20-dione.

References Cited in the file of this patent
UNITED STATES PATENTS

| | | |
|---|---|---|
| 2,838,497 | Spero et al. | June 10, 1958 |
| 2,838,532 | Spero et al. | June 10, 1958 |
| 2,841,600 | Hogg et al. | July 1, 1958 |